United States Patent
Huang et al.

(10) Patent No.: US 10,940,073 B2
(45) Date of Patent: Mar. 9, 2021

(54) WEARABLE FINGER REHABILITATION DEVICE

(71) Applicant: REHABOTICS MEDICAL TECHNOLOGY CORPORATION, Zhubei (TW)

(72) Inventors: Jian-Jia Huang, Nantou (TW); Shu-Wei Pu, Taichung (TW); Sung-Yu Tsai, Taoyuan (TW)

(73) Assignee: REHABOTICS MEDICAL TECHNOLOGY CORPORATION, Hsinchu County (TW)

( * ) Notice: Subject to any disclaimer, the term of this patent is extended or adjusted under 35 U.S.C. 154(b) by 461 days.

(21) Appl. No.: 15/857,131

(22) Filed: Dec. 28, 2017

(65) Prior Publication Data
US 2018/0185231 A1 Jul. 5, 2018

(30) Foreign Application Priority Data

Dec. 30, 2016 (TW) .................................. 105144118

(51) Int. Cl.
*A61H 1/02* (2006.01)
*B25J 9/12* (2006.01)

(52) U.S. Cl.
CPC ............ *A61H 1/0288* (2013.01); *B25J 9/123* (2013.01); *A61H 2201/0157* (2013.01); *A61H 2201/123* (2013.01); *A61H 2201/165* (2013.01); *A61H 2201/1638* (2013.01); *A61H 2201/1664* (2013.01); *A61H 2201/1676* (2013.01); *A61H 2201/501* (2013.01); *A61H 2201/5097* (2013.01); *A61H 2205/067* (2013.01)

(58) Field of Classification Search
CPC .. A61H 1/0274; A61H 1/0285; A61H 1/0288; A61H 5/00; A61H 5/01; A61H 5/0102; A61F 2/583; A61F 2/586; A61F 2/587; B25J 9/10; B25J 9/106; B25J 9/1065; B25J 9/1075; B25J 9/12; B25J 9/123; B25J 15/0009; A61B 34/70
USPC ................................................... 901/30–39
See application file for complete search history.

(56) References Cited

U.S. PATENT DOCUMENTS

| 9,375,382 | B2 | 6/2016 | Fausti et al. |
| 2011/0160873 | A1* | 6/2011 | Jaworski ................. A61F 2/586 |
| | | | 623/64 |
| 2013/0261514 | A1 | 10/2013 | Tsui et al. |

FOREIGN PATENT DOCUMENTS

| CN | 102811690 B | 11/2016 |
| TW | 201041572 A1 | 12/2010 |
| TW | 201313217 A1 | 4/2013 |
| TW | I412354 B | 10/2013 |
| TW | 201611793 A | 4/2016 |
| TW | 201620587 A | 6/2016 |

(Continued)

*Primary Examiner* — Marcia L Watkins
(74) *Attorney, Agent, or Firm* — Muncy, Geissler, Olds and Lowe, P.C.

(57) ABSTRACT

The invention provides a wearable hand rehabilitation apparatus equipped on the back of users' hand. The wearable hand rehabilitation device could help the users to do their hand or finger rehabilitation. The wearable hand rehabilitation apparatus includes a thumb mechanism, three finger mechanisms and a pinky finger mechanism. These mechanisms could make the user's fingers bent or straightened. And the wearable hand rehabilitation apparatus could reduce the physical damage of the users during the period of doing rehabilitation with the present invention.

3 Claims, 12 Drawing Sheets

(56) References Cited

FOREIGN PATENT DOCUMENTS

| WO | WO2011/117901 | A1 | 9/2011 |
| WO | WO2012/120393 | A2 | 9/2012 |
| WO | WO2016/117758 | A1 | 7/2016 |

\* cited by examiner

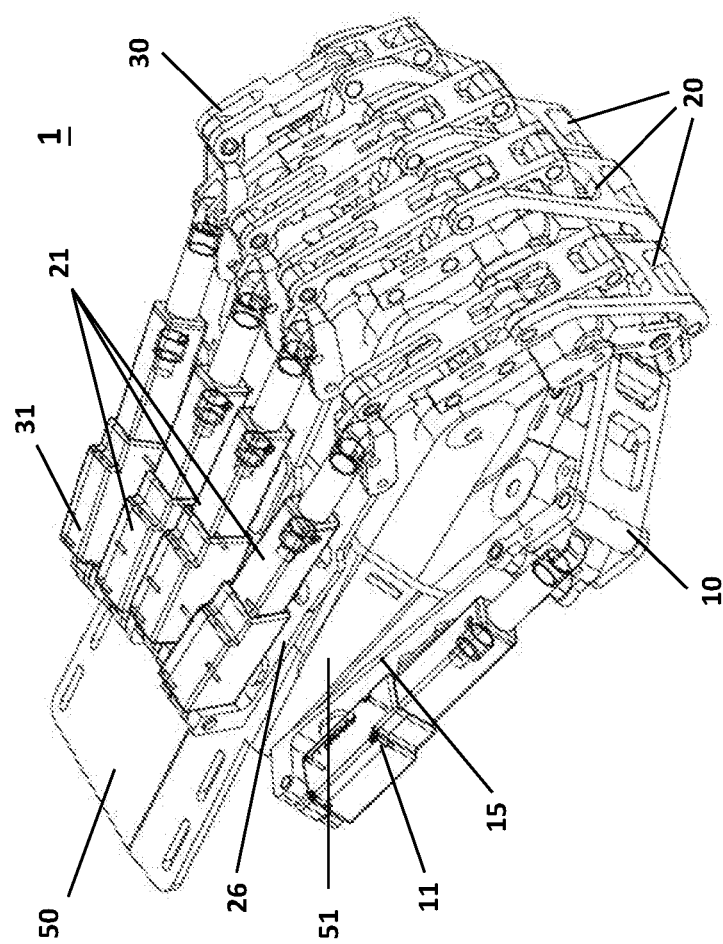
[Fig. 1A]

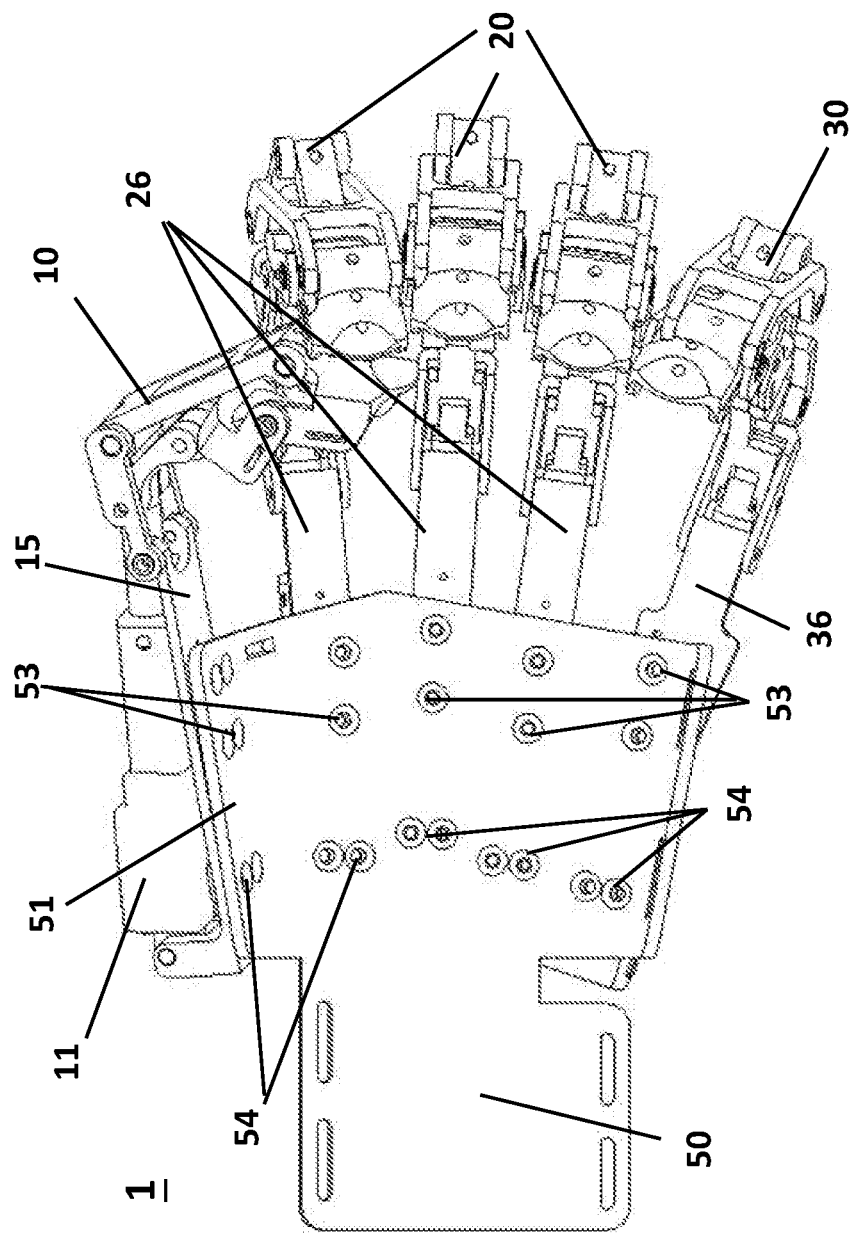
[Fig 1B]

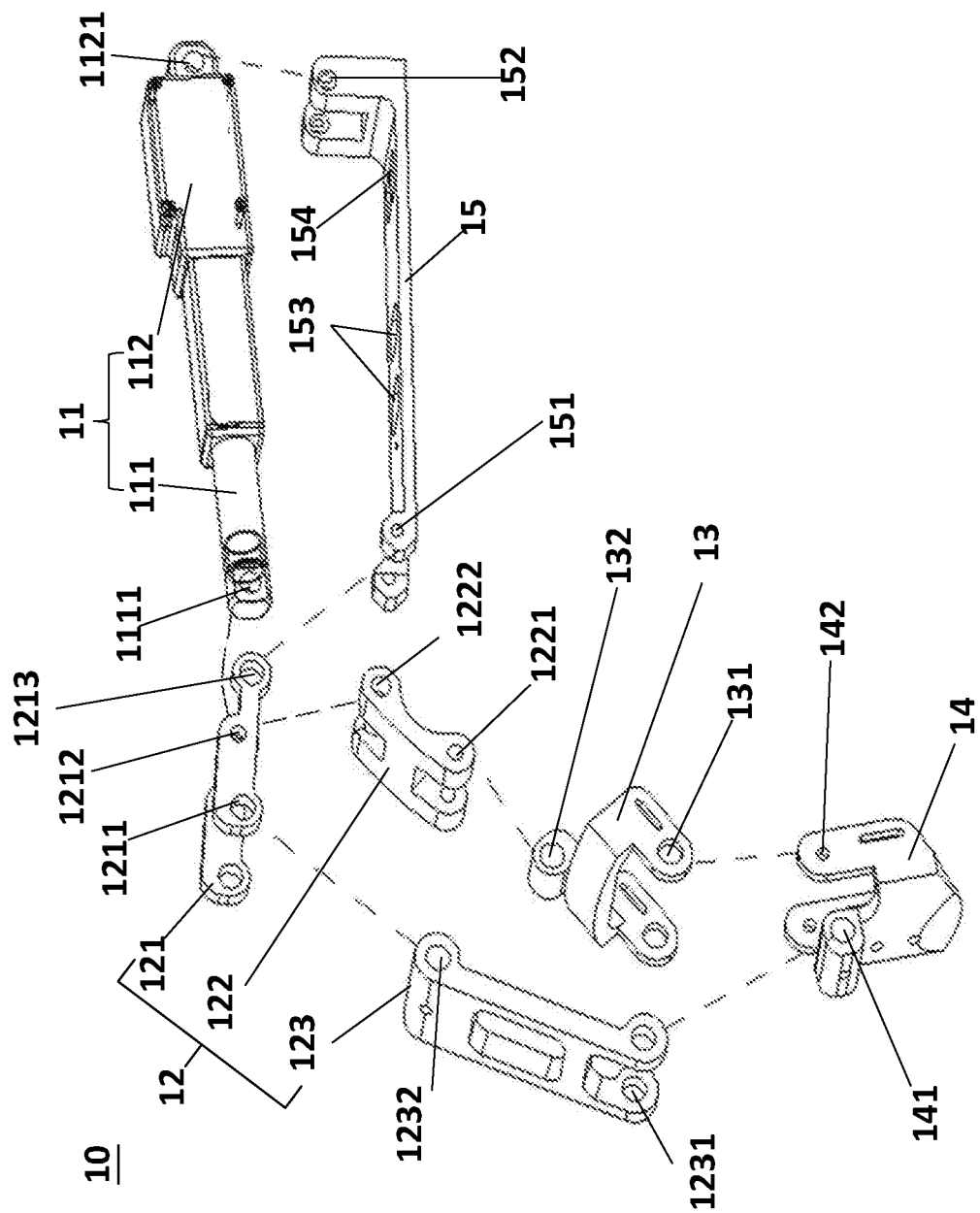
[Fig. 2]

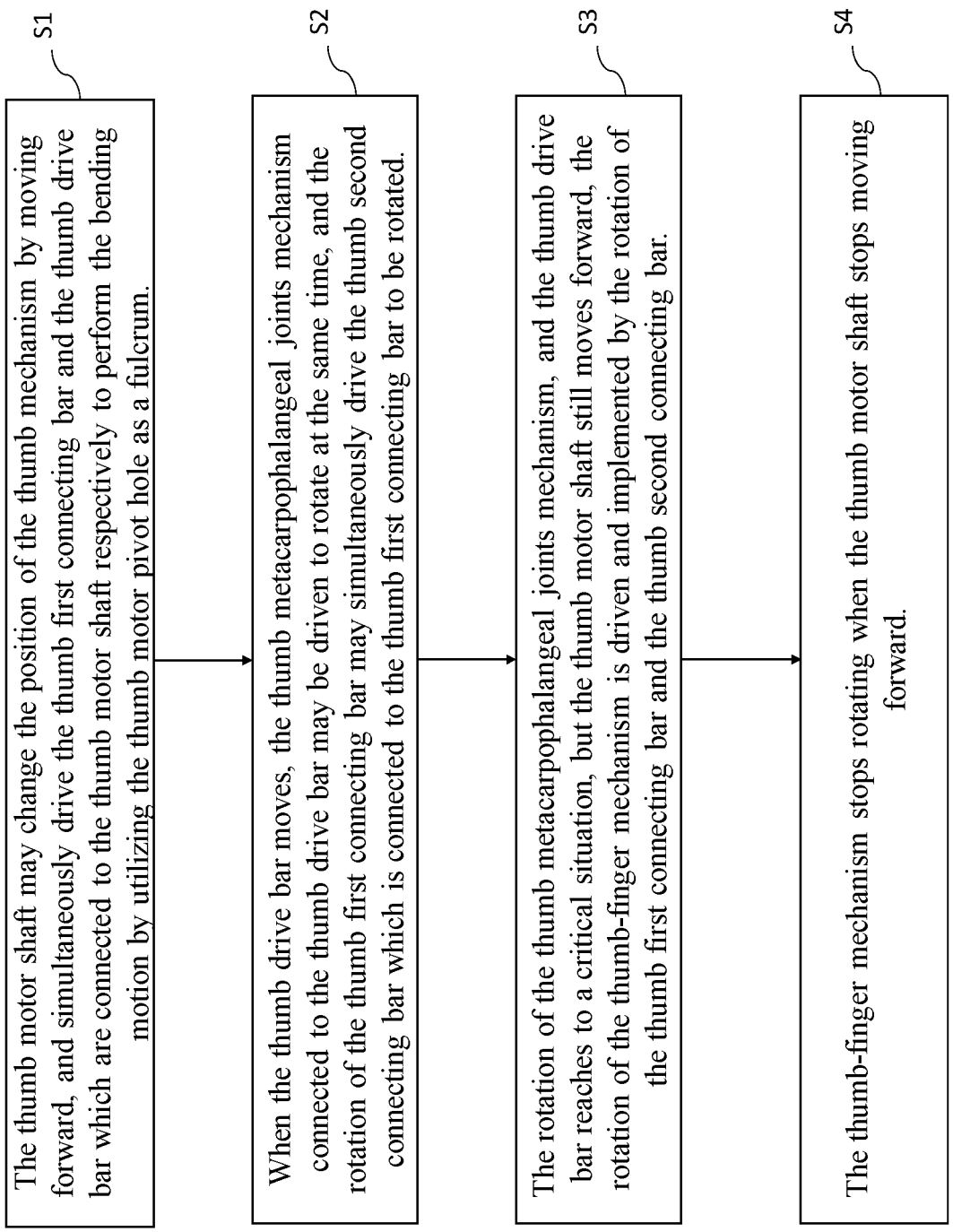
[Fig. 3]

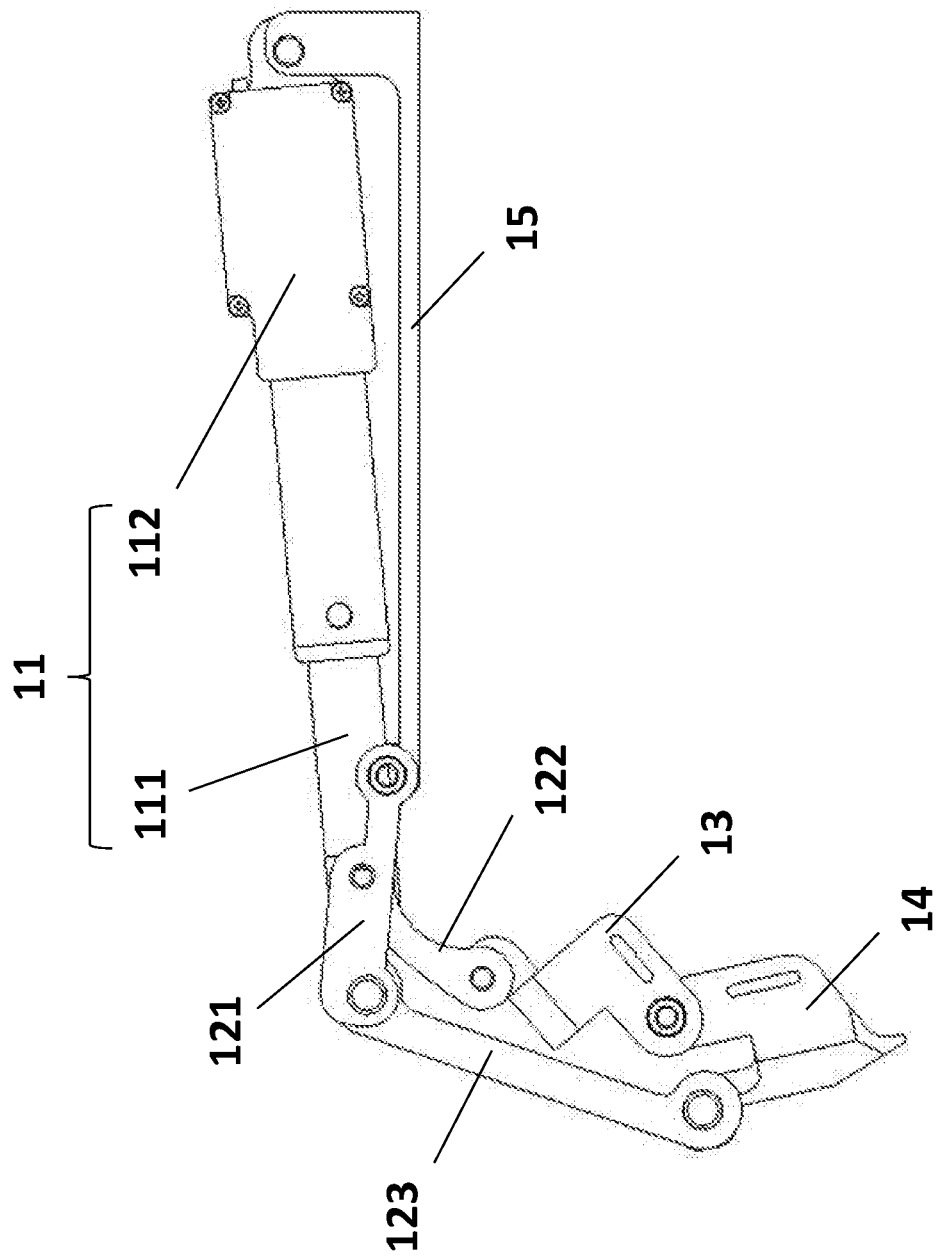
[Fig. 4]

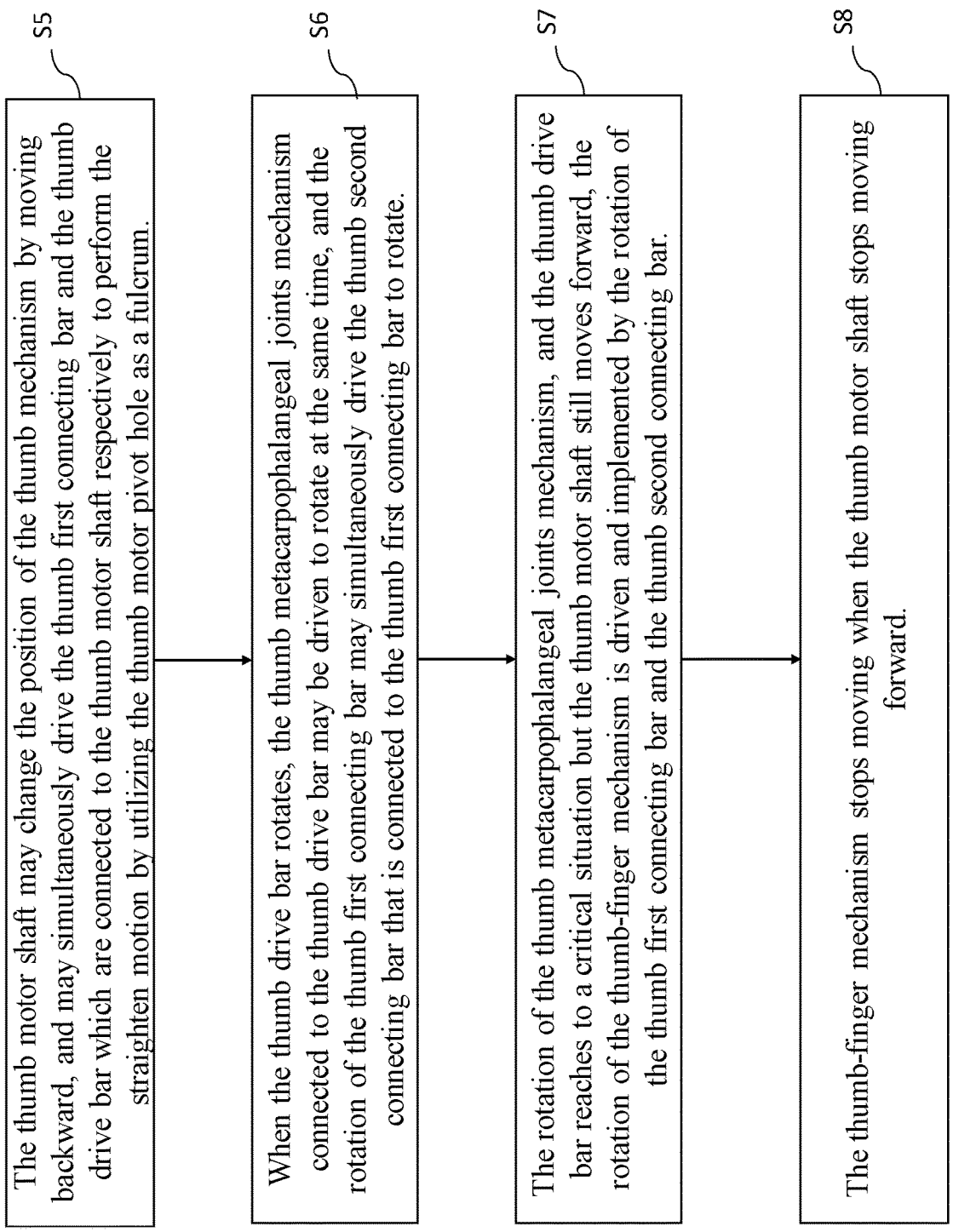
[Fig. 5]

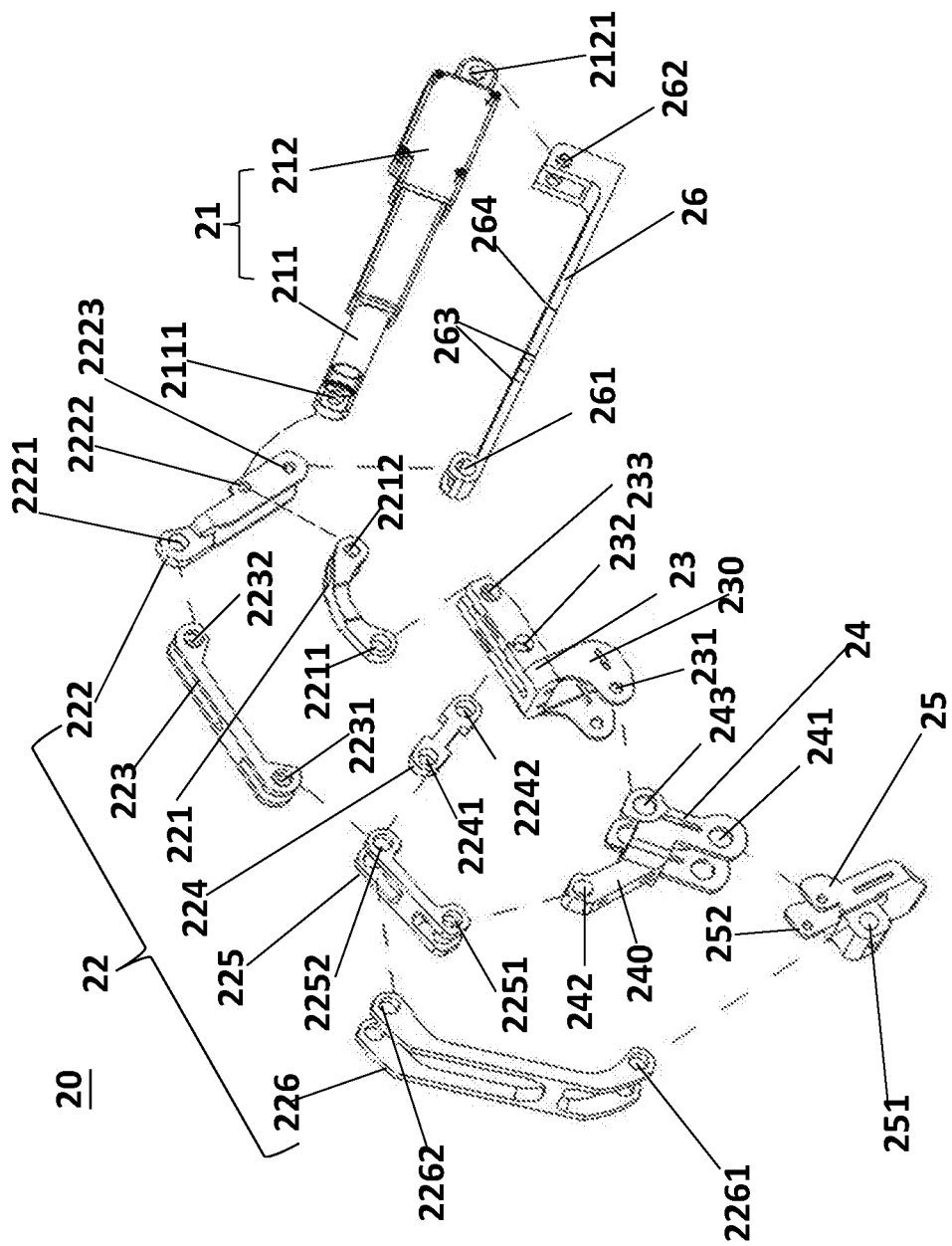

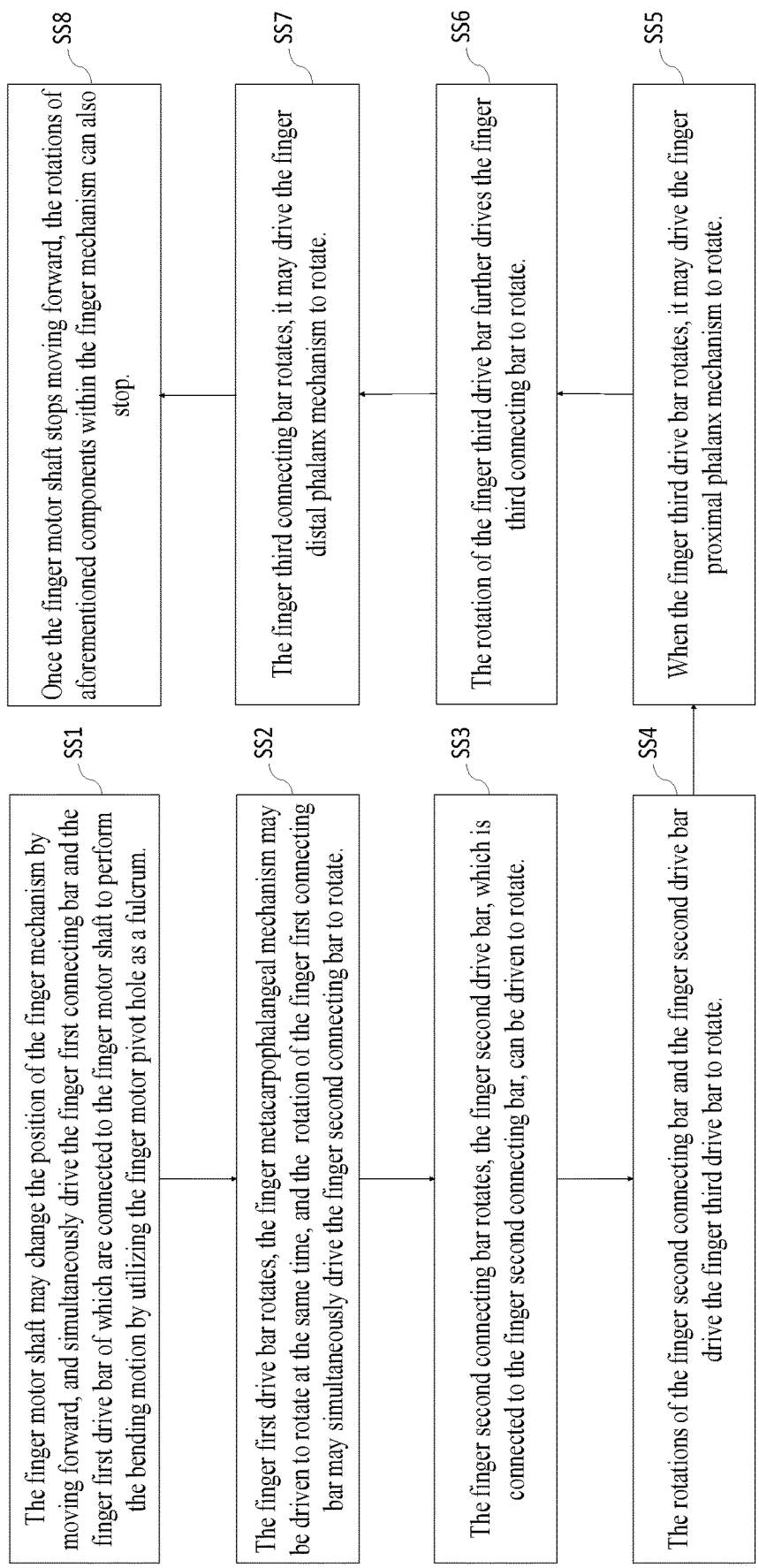
[Fig. 7]

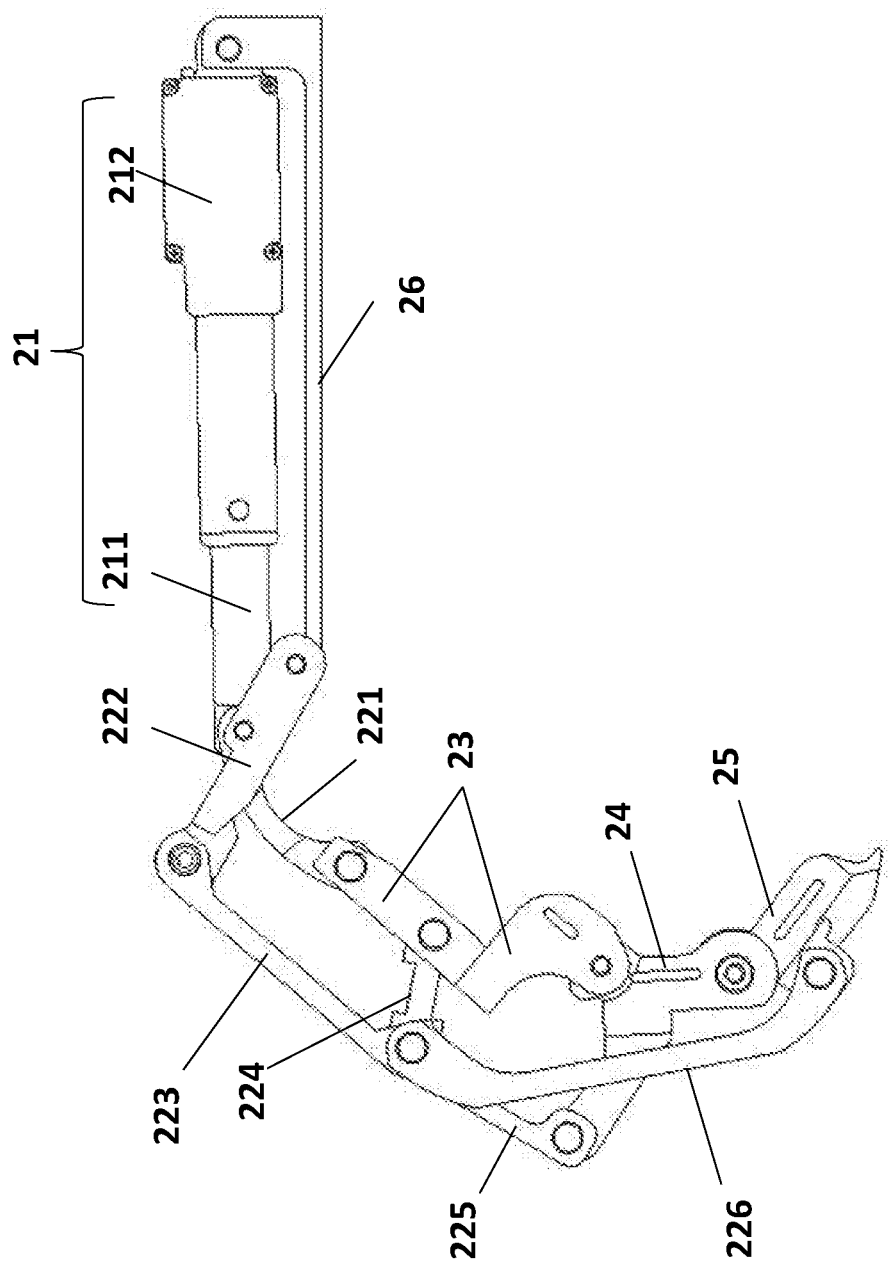
[Fig. 8]

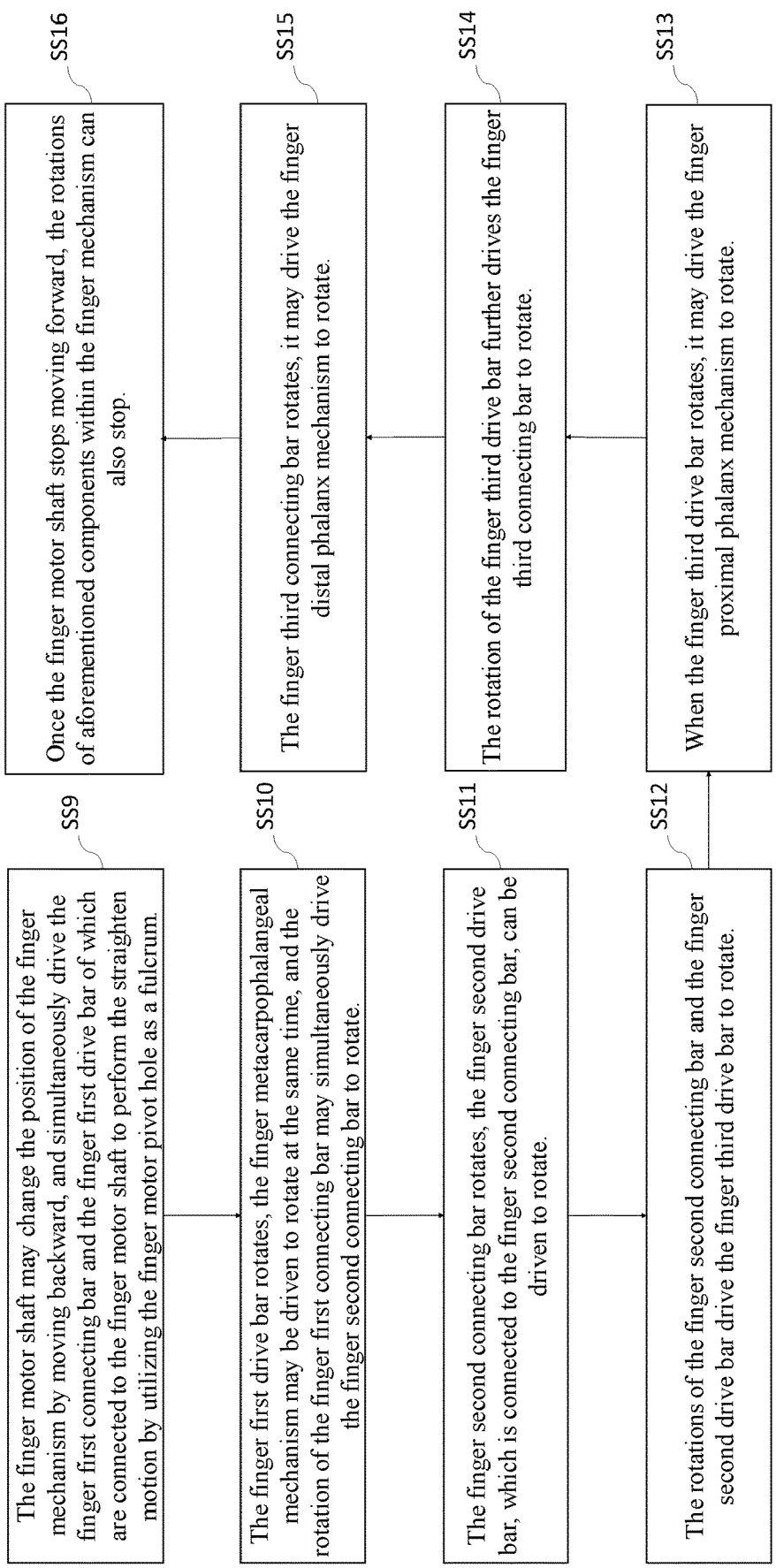
[Fig. 9]

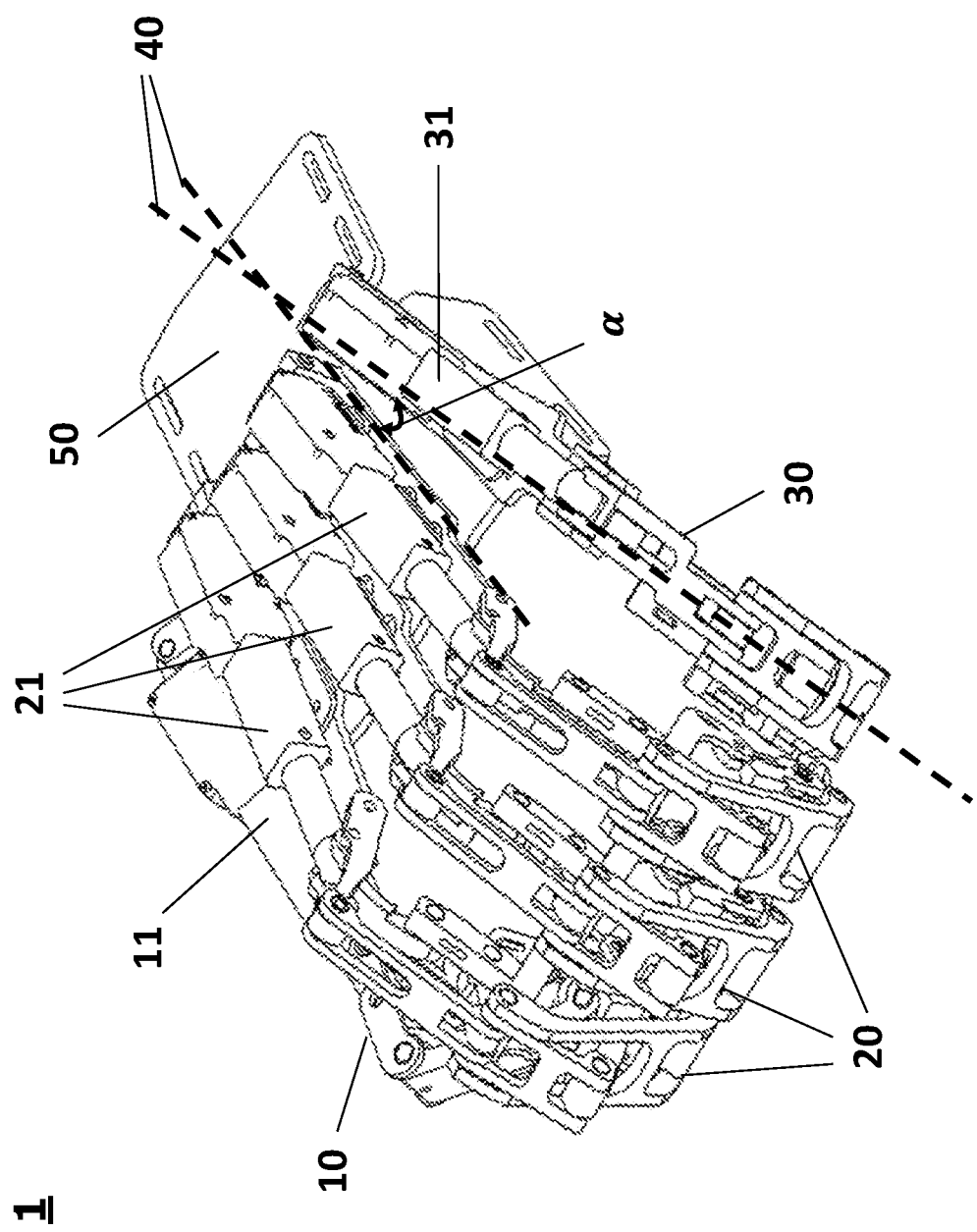

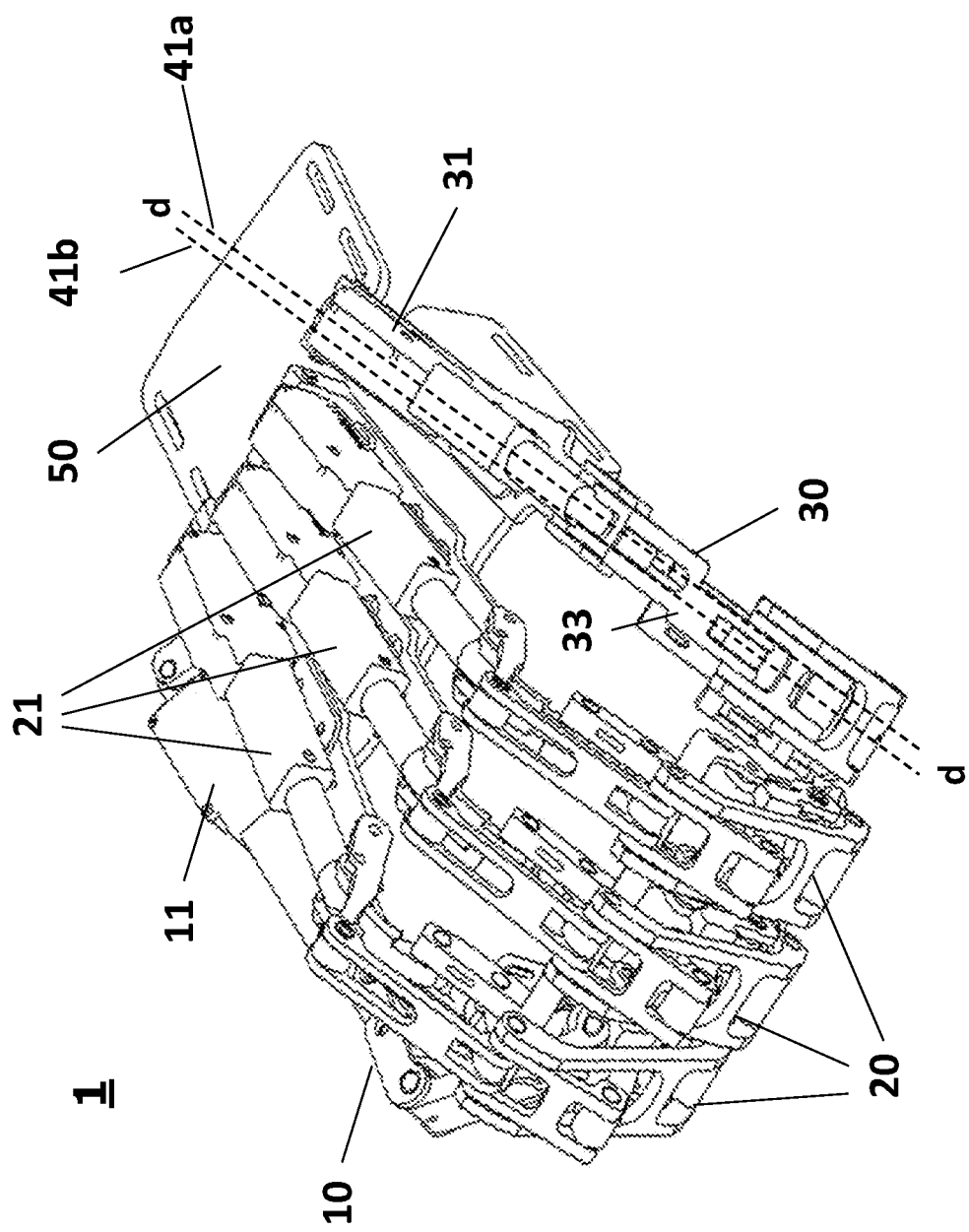
[Fig. 11]

WEARABLE FINGER REHABILITATION DEVICE

CROSS-REFERENCE TO RELATED APPLICATIONS

This application claims priority to Taiwan Patent Application No. 105144118, filed Dec. 30, 2016, the content of which are hereby incorporated by reference in their entirety.

FIELD OF THE INVENTION

The present invention relates to a wearable finger rehabilitation apparatus, and particularly relates to a wearable finger rehabilitation apparatus with use of connecting bar and drive bar to help bending and extension motion for fingers of the user.

BACKGROUND OF THE INVENTION

Mechanical medical assist device is a main rehabilitation apparatus clinically for patient, and presently most of such a mechanical medical assist device is of wearable type.

There is difficulty to some degree on the design of medical assist device relative to fingers because the anatomy of hand is very complex and multiple degrees of freedom on acting for fingers of user needs to be considered. Most of relevant patents in public are featured in achievement of bending and extension of fingers. China Patent No. CN102811690B recites a finger rehabilitation apparatus, which drives bending and extension of for fingers of the user by a way of guiding cables, and an involved device of motor (or actuator) thereof supplies power by moving forward and downward with a motor shaft. However, in practice, the positions of guiding cables should be arranged precisely along with position of metacarpophalangeal joints (MCP joints), proximal interphalangeal joints (PIP joints), and distal interphalangeal joints (DIP joints) of the fingers of the user, so that the complexity of such a wearable apparatus increases. Moreover, during pulling and releasing of the guiding cables acting on the user's fingers, the user's fingers are possibly hurt by any blocked cables.

Considering factors aforementioned, it is necessary for current market to have designs that drive user's fingers without using guiding cables to improve the wearability and can take easy to wear. Moreover, these designs are expected to reduce physical damages on the user's fingers during the actions of the wearable rehabilitation.

SUMMARY OF THE INVENTION

According to aforementioned, an objective of the present invention is to provide a thumb mechanism. The thumb mechanism includes a linear direct drive motor comprising a motor shaft and a motor device, in which the motor shaft is arranged in the motor device, the motor device is arranged onto a bottom bar, a front motor pivot hole is at a front end of the motor shaft, a rear motor pivot hole is at a free end of the motor device, and a front pivot hole and a rear pivot hole are respectively arranged at two free ends of the bottom bar, and wherein the rear motor pivot hole is coupled to the rear pivot hole, a thumb first connecting bar provided with a first pivot hole at a front end, a second pivot hole at a middle part, and a third pivot hole at a rear end thereof, wherein the second pivot hole is coupled to the front motor pivot hole, and the third pivot hole is coupled to the front pivot hole. A thumb second connecting bar provided with a fourth pivot hole at a front end and a fifth pivot hole at a rear end thereof, wherein the fifth pivot hole is coupled to the first pivot hole; a thumb drive bar provided with a sixth pivot hole at a front end and a seventh pivot hole at a rear end thereof, wherein the seventh pivot hole is coupled to the second pivot hole; a thumb metacarpophalangeal joint mechanism provided with a pair of eighth pivot holes at a front end and a ninth pivot hole at another end thereof, wherein the ninth pivot hole is coupled to the sixth pivot hole, and a finger and thumb mechanism provided with a tenth pivot hole at an upper end thereof and a pair of eleventh pivot holes at one end of a side adjacent to a thumb metacarpophalangeal joint mechanism, wherein the tenth pivot hole is coupled to the fourth pivot hole, and the pair of eleventh pivot holes is coupled to the pair of eighth pivot holes.

Another objective of the present invention is to provide a finger mechanism. The finger mechanism includes a linear direct drive motor that includes a motor shaft and a motor device, wherein the motor shaft is arranged in the motor device, the motor device is arranged in a bottom bar, a motor shaft front end is equipped with a front motor pivot hole, a free end of the motor device is equipped with a rear motor pivot hole, and a front pivot hole and a rear pivot hole are respectively arranged at two free ends of the bottom bar, in which the rear motor pivot hole is coupled to the rear pivot hole on the bottom bar. A finger first connecting bar provided with a first pivot hole at a front end, a second pivot hole near a middle part, and a third pivot hole at a rear end thereof, in which the second pivot hole is coupled to the motor pivot hole of front, and the third pivot hole is coupled to the front pivot hole. A finger second connecting bar provided with a fourth pivot hole at a front end and a fifth pivot hole at a rear end thereof, in which the fifth pivot hole is coupled to the first pivot hole. A finger third connecting bar of provided with a twenty-first pivot hole at a front end and a sixth pivot hole at a rear end thereof. A finger first drive bar provided with a seventh pivot hole at a front end and an eighth pivot hole at a rear end thereof, in which the eighth pivot hole is coupled to the second pivot hole. A finger second drive bar provided with a ninth pivot hole at a front end and a tenth pivot hole at a rear end thereof. A finger third drive bar provided with an eleventh pivot hole at a front end and a twelfth pivot hole at a rear end thereof, in which the twelfth pivot hole is coupled to the fourth pivot hole, the sixth pivot hole and the ninth pivot hole. A finger metacarpophalangeal joint mechanism provided with a link portion extending downward at a front end thereof, a pair of thirteenth pivot holes at an end of the link portion, a fourteenth pivot hole at a middle part thereof, and a fifteenth pivot hole at another end thereof, in which the fourteenth pivot hole is coupled to the tenth pivot hole, and the fifteenth pivot hole is coupled to the seventh pivot hole. A phalanx proximal digitorum manus mechanism provided with a pair of sixteenth pivot holes at a front end and a pair of seventeenth pivot holes at another end thereof, a connection portion extending upward between the two ends thereof, and a eighteenth pivot hole at an end of the connection portion, wherein the pair of seventeenth pivot holes is coupled to the thirteenth pivot hole, and the eighteenth pivot hole is coupled to the eleventh pivot hole, and a finger distal phalanx mechanism provided with a nineteenth pivot hole at an upper end thereof, a pair of twentieth pivot holes at an end of a side near the finger proximal phalanx mechanism, wherein the nineteenth pivot hole is coupled to the twenty-first pivot hole, and the pair of twentieth pivot holes is coupled to the pair of sixteenth pivot holes.

A still objective of the present invention is to provide a wearable finger rehabilitation apparatus. The wearable finger rehabilitation apparatus includes a palm base of a plate structure provided with a front end and a rear end, and the rear end is opposite to the front end, and two sides between the front end and the rear end, and a joint connecting part at one of the sides to form a L-shaped structure by the joint connecting part and the plate structure. A four fingers mechanism adjacent each another is arranged on one end of the palm base. A thumb mechanism is arranged onto the joint connecting part, in which there is an offset angle of from 5 degrees to 15 degrees between a pinky finger mechanism of the four fingers mechanism and the adjacent finger mechanism.

According to above objectives, the present invention provides a thumb and the four fingers are equally arranged on the bottom bar to form a modular thumb mechanism and a modular four fingers mechanism. The modular four fingers mechanism includes a fingers mechanism and a pinky finger mechanism. Accordingly, the wearable finger rehabilitation apparatus of the present invention may have modular designs for different hand sizes to suit various sizes of the user's fingers for improving the comfortability in wearing and rehabilitation effect with suitable sizes of rehabilitation apparatus.

According to above objectives, the present invention may make the abduction angle between the modular pinky finger mechanism and the adjacent modular finger mechanism be adjusted according to the size of the user's palm. Besides, the degrees of freedom of radial arrangement of the three finger mechanisms and the pinky finger mechanism makes the user wear comfortably and the rehabilitation effect also improves because of the suitable sizes. Besides, there is a displacement distance "d" between a center line of the motor shaft of the linear direct drive motor on the pinky finger mechanism and a center line of the first connecting bar on the pinky finger mechanism. The abduction design may further increase the degrees of freedom of the radial arrangement among the four fingers to make the user wear comfortably, as well as enhance the rehabilitation effects.

According to above objectives, that the modular thumb mechanism is arranged on the L-shaped like joint connecting part enabling the thumb mechanism, the three finger mechanisms and the pinky finger mechanism to be fixed at different planes for complying with nature construction/ergonomics of thumb and other fingers. When the thumb mechanism, the three finger mechanisms and the pinky finger mechanism are respectively fixed to the L-shaped like structure formed by the palm base and the joint connecting part, the thumb mechanism may bend freely at another direction. Besides, the L-shaped like structure fixed on palm base and the joint connecting part not only makes five fingers of user easy to wear the wearable finger rehabilitation apparatus but also prevents the thumb mechanism from interfering the three finger mechanisms and the pinky finger mechanism in bending.

According to above objectives, the most rehabilitation effect for user can be achieved owing to the modular designs of wearable finger rehabilitation apparatus, optimized design of finger mechanisms, comfort in wear, and safety from the usage of linear direct drive motor.

BRIEF DESCRIPTION OF THE DRAWINGS

FIG. 1A is a stereogram of illustrating a wearable finger rehabilitation apparatus in accordance with the present invention.

FIG. 1B is a bottom view of a wearable finger rehabilitation apparatus in accordance with the present invention.

FIG. 2 is an exploded drawing of illustrating a thumb mechanism in accordance with the present invention.

FIG. 3 is a flow chart of illustrating motion (thumb bending) of a thumb mechanism in accordance with the present invention.

FIG. 4 is a schematic of illustrating bending of a thumb mechanism in accordance with the present invention.

FIG. 5 is a flow chart of illustrating motion (thumb straighten) of a thumb mechanism in accordance with the present invention.

FIG. 6 is an exploded drawing of illustrating a finger mechanism in accordance with the present invention.

FIG. 7 is a flow chart of illustrating motion (finger bending) of a finger mechanism in accordance with the present invention.

FIG. 8 is a schematic of illustrating bending of a finger mechanism in accordance with the present invention.

FIG. 9 is a flow chart of illustrating motion (finger straighten) of a finger mechanism in accordance with the present invention.

FIG. 10 is a schematic of showing a pinky finger mechanism arranged on a palm base in accordance with the present invention.

FIG. 11 is a schematic of showing the abduction design of a pinky finger mechanism in accordance with the present invention.

DETAILED DESCRIPTION OF THE PREFERRED EMBODIMENT

In order to let one of skilled in the art sufficiently understand the technical contents of a thumb mechanism, a finger mechanism, a pinky finger mechanism, and a wearable finger rehabilitation apparatus of the present invention, relative embodiments and methods are provided to illustrate the present invention. However, materials and compositions of joint mechanisms mentioned in following embodiments do not limit the present invention. These materials and compositions are generally steel materials of specific strength, such as composition of iron and steel. Furthermore, the configurations of components of joint mechanisms are not limited to specific types. Moreover, fundamental mechanism principles relative to the present invention will not be illustrated in following paragraphs. Furthermore, a front or a forward direction refers to the direction which the finger motor shaft ejects to. Meanwhile, a backward or a backward direction refers to a direction that opposites from the forward direction.

In order to provide clear consideration on a thumb mechanism, a finger mechanism, a pinky finger mechanism, a wearable finger rehabilitation apparatus, and the components thereof, some definitions are illustrated here: front end means a portion near fingertip; rear end is a portion oppose to the front end such as a portion near wrist; middle part means a portion between the front end and the rear end; upper end means a direction same as back of hand; and lower end means a direction same as palm of hand.

FIG. 1A is a stereogram of illustrating a wearable finger rehabilitation apparatus in accordance with the present invention. Shown in FIG. 1A, a wearable finger rehabilitation apparatus 1 of the present invention includes a thumb mechanism 10, a plurality of finger mechanisms 20, a pinky finger mechanism 30 and a palm base 50. The thumb mechanism 10, the plurality of finger mechanisms 20 and the pinky finger mechanism 30 are respectively fixed onto one end of the palm base 50. The thumb mechanism 10 is connected by a joint connecting part 51 in a L-shaped like structure with respect to the palm base 50, so that the thumb mechanism 10 is at a plane which is different from one at which the plurality of finger mechanisms 20 and the pinky finger mechanism 30 are for complying with the human body construction/ergonomics. The arrangement that the thumb mechanism 10, the plurality of finger mechanisms 20 and the pinky finger mechanism 30 are respectively fixed to a L-shaped like structure of the joint connecting part 51, and the palm base 50 may enable the thumb mechanism 10 to bend freely in the different direction. Besides, the L-shaped like structure formed by the palm base 50 and the joint connecting part 51 not only makes the user's five fingers easy to wear the wearable finger rehabilitation apparatus 1 but also prevents the thumb mechanism 10 from interrupting the plurality of finger mechanisms 20 and the pinky finger mechanism 30 in bending.

Please refer to FIG. 1A, the palm base 50 and the joint connecting part 51 are fixedly connected with a thumb bottom bar 15 of the thumb mechanism 10, a plurality of finger bottom bars 26 of the plurality of finger mechanisms 20 and a portion of pinky bottom bars 36 (as shown in FIG. 1B) of the pinky finger mechanism 30, and a connection way is illustrated in FIG. 1B. Moreover, a linear direct drive motors 11, 21, 31 are respectively equipped to the thumb bottom bar 15, each one of the finger bottom bars 26, and the pinky bottom bar 36 on the palm base 50 and the joint connecting part 51. The free ends of the bottom bar of thumb 15, each one of the bottom bars of finger 26, and the bottom bar of pinky finger 36 are connected to the thumb mechanism 10, the plurality of finger mechanisms 20 and the pinky finger mechanism 30, respectively. Thus, the thumb mechanism 10, the plurality of finger mechanisms 20, and the pinky finger mechanism 30 are arranged at outside of the palm base 50 and the joint connecting part 51.

FIG. 1B is a bottom view of a wearable finger rehabilitation apparatus in accordance with the present invention. Shown in FIG. 1B, the palm base 50 and the joint connecting part 51 are respectively fixed with the thumb bottom bar 15, a portion of the plurality of finger bottom bars 26, and a portion of the pinky bottom bar 36 with a plurality of locking members 53, 54. Next, the thumb bottom bar 15 and the plurality of finger bottom bars 26 and the portion of the pinky bottom bar 36 are exposed to outsides the palm base 50 and the joint connecting part 51. Furthermore, free ends of the thumb bottom bar 15, the plurality of finger bottom bars 26 and the pinky bottom bar 36, which extending outside the palm base 50 and the joint connecting part 51, are connected to the thumb mechanism 10, the plurality of finger mechanisms 20, and the pinky finger mechanism 30 respectively, so as to enable the thumb mechanism 10, the plurality of finger mechanisms 20, and the pinky finger mechanism 30 act in space outside the palm base 50 and the joint connecting part 51. It is noted that the thumb bottom bar 15, the plurality of finger bottom bars 26, and the pinky bottom bar 36 are fixedly connected together with the palm base 50 and the joint connecting part 51 via the locking members 53, 54.

FIG. 2 is an exploded drawing of illustrating a thumb mechanism in accordance with the present invention, and dash lines in FIG. 2 shows the connecting relationship among each component. As shown in FIG. 2, the thumb mechanism 10 includes a thumb linear direct drive motor 11, a thumb connecting bar drive shaft 12, a thumb metacarpophalangeal joint mechanism 13, and a thumb-finger mechanism 14. The thumb linear direct drive motor 11 includes a thumb motor shaft 111 and a thumb motor device 112. The thumb motor shaft 111 is arranged within the thumb motor device 112 and driven by the thumb motor device 112 to move forward and backward. Besides, a thumb pivot hole 1111 (i.e. the motor pivot hole of front on the thumb mechanism 10) is deposited at a front end of the thumb motor shaft 111, and a thumb motor pivot hole 1121 (i.e. the rear motor pivot hole on the thumb mechanism 10) is deposited at a rear end of the thumb motor device 112. Next, the thumb connecting bar drive shaft 12 includes a thumb drive bar 122, a thumb first connecting bar 121 and a thumb second connecting bar 123. The thumb pivot hole 1221 (i.e. the sixth pivot hole on the thumb mechanism 10) is positioned at a front end of the thumb drive bar 122, and a thumb pivot hole 1222 (i.e. the seventh pivot hole on the thumb mechanism 10) for connecting the thumb pivot hole 1111 on the thumb motor shaft 111 is positioned at a rear end of the thumb drive bar 122. A thumb pivot hole 1211 (i.e. the first pivot hole on the thumb mechanism 10) is positioned at a front end of the thumb first connecting bar 121, and a thumb pivot hole 1212 (i.e. the second pivot hole on the thumb mechanism 10) is positioned near a middle part of the thumb first connecting bar 121. Furthermore, the thumb pivot hole 1212 is configured to connect the thumb pivot hole 1222 at the rear end of the thumb drive bar 122 and the thumb pivot hole 1111 on the thumb motor shaft 111. A thumb pivot hole 1213 (i.e. the third pivot hole on the thumb mechanism 10) is positioned at a rear end of the first thumb connecting bar 121. A thumb pivot hole 1231 (i.e. the fourth pivot hole on the thumb mechanism 10) and a thumb pivot hole 1232 (i.e. the fifth pivot hole on the thumb mechanism 10) are deposited at a front end and a rear end of the thumb second connecting bar 123, respectively. The thumb pivot hole 1232 is configured to connect to the thumb pivot hole 1211 at the front end of the thumb first connecting bar 121. In a preferred embodiment, a length of the thumb second connecting bar 123 is longer than that of the thumb first connecting bar 121.

Please refer to FIG. 2 continuously, the thumb metacarpophalangeal joint mechanism 13 is arranged on the thumb mechanism 10 and is an inverse U-shaped like structure which provides open space for accommodating a thumb of the user (not shown in the drawing). A pair of thumb pivot holes 131 (i.e. the eighth pivot hole on the thumb mechanism 10) is deposited at a front end of the thumb metacarpophalangeal joint mechanism 13, and another thumb pivot hole 132 (i.e. the ninth pivot hole on the thumb mechanism 10) is arranged at an upper end of the inverse U-shaped like structure. The thumb pivot hole 132 is configured to connect the thumb pivot hole 1221 at the front end of the thumb drive bar 122. Moreover, the thumb mechanism 10 further includes a thumb-finger mechanism 14, and the thumb-finger mechanism 14 is also an inverse U-shaped like structure so as to have open space for accommodating the user's thumb (not shown). A thumb pivot hole 141 (i.e. the tenth pivot hole on the thumb mechanism 10) arranged at an upper end of the inverse U-shaped like structure is used to connect the thumb pivot hole 1231 at the front end of the thumb second connecting bar 123. A thumb pivot hole 142 (i.e. the eleventh pivot hole on the thumb mechanism 10) arranged at a back end of the thumb-finger mechanism 14 is used to connect one thumb pivot hole 131 at the front end of the thumb metacarpophalangeal joint mechanism 13. Next, the thumb mechanism 10 further includes a thumb bottom bar 15, and the thumb bottom bar 15 with thumb through holes 153, 154 is fixed onto the palm base 50 and the joint connecting part 51 by the locking members 53, 54 (as shown in FIG. 1B). A thumb pivot hole 151 (i.e. the front pivot hole on the thumb mechanism 10) arranged at a front end of the thumb bottom bar 15 is used to connect the thumb pivot hole 1213 at the rear end of the thumb first connecting bar 121. Next, a thumb pivot hole 152 formed at a rear end of the thumb bottom bar 15 is configured to connect the thumb motor pivot hole 1121 at the rear end of the thumb motor device 112. It is noted that a link point connecting the thumb pivot hole 152 (i.e. the rear pivot hole on the thumb mechanism 10) and the thumb motor pivot hole 1121 may be a movable fulcrum to movably fix the thumb linear direct drive motor 11 within the thumb pivot hole 152. Besides, the thumb linear direct drive motor 11 may move upward and downward along with angles of bending or extension of the thumb mechanism 10 driven by forward and backward displacement of the thumb motor shaft 111. Accordingly, the wearable finger rehabilitation apparatus 1 of the present invention may have modular designs for different sizes of the thumb mechanism 10 to suit various sizes of the user's thumb for improving the comfort in wearing and rehabilitation effect with the suitable sizes of the rehabilitation apparatus. It is noted that the connection of the thumb through holes 153, 154 and the locking members 53, 54 is implemented by screws. In the case of dimensions of the thumb through holes 153, 154 are bigger than the ones of the screws (not shown), the volume of the thumb through holes 153, 154 may be used to adjust the position of the thumb mechanism 10 on the joint connecting part 51 when the locking members 53, 54 are mounted into the thumb through holes 153, 154. Thus, radial angles of the thumb mechanism 10 on the palm can be also adjusted according to the physiological structure of user's palm to make the user wear comfortably.

FIG. 3 is a flow chart of illustrating motion (thumb bending) of a thumb mechanism in accordance with the present invention. Please refer to FIG. 2 and FIG. 3, Step S1: in the case of the thumb mechanism 10 applying onto the user's thumb in a straightened state (not shown in the drawings), the thumb motor shaft 111 may change the position of the thumb mechanism 10 by moving forward and simultaneously drive the thumb first connecting bar 121 and the thumb drive bar 122 which are connected to the thumb motor shaft 111 respectively to perform the bending motion. Moreover, during the bending motion of the thumb mechanism 10, the thumb linear direct drive motor 11 moves upward and downward along with the angle of the bending of the thumb mechanism 10 by utilizing the thumb motor pivot hole 1121 as a fulcrum. Next, Step S2: when the thumb drive bar 122 moves, the thumb metacarpophalangeal joint mechanism 13 connected to the thumb drive bar 122 may be driven to rotate at the same time. When the thumb metacarpophalangeal joint mechanism 13 rotates, user's thumb metacarpophalangeal (MCP) joint can rotate together (to result in the thumb bending). Furthermore, the rotation of the thumb first connecting bar 121 may simultaneously drive the thumb second connecting bar 123 which is connected to the thumb first connecting bar 121 to be rotated. Next, Step S3: in the case of the rotation of the thumb metacarpophalangeal joint mechanism 13, and the thumb drive bar 122 reaches to a critical situation (for example, user's thumb metacarpophalangeal joints stops rotating) but the thumb motor shaft 111 still moves forward, the rotation of the thumb-finger mechanism 14 is driven and implemented by the rotation of the thumb first connecting bar 121 and the thumb second connecting bar 123. The rotation of the thumb-finger mechanism 14 may simultaneously drive the interphalangeal joint (IP joint) of user's thumb to rotate (to result in the thumb bending). Next, Step S4: the thumb-finger mechanism 14 stops rotating when the thumb motor shaft 111 stops moving forward. At this moment, the rotation of user's interphalangeal joint also stops, and the gesture of user's thumb is changed from the straightened state into bending state to reach the purpose of bending the user's thumb. FIG. 4 is a schematic of illustrating bending of the thumb mechanism in accordance with the present invention. Please refer to FIG. 4 with reference of acting steps aforementioned, the bending motion of the user's thumb driven by the thumb mechanism 10 is performed along with a stable motion of the thumb motor shaft 111. Consequently, the possibly physical damage on the user's thumb made by the motion of those mechanisms aforementioned may be reduced because the bending of the thumb mechanism 10 is controlled within limited displacements.

FIG. 5 is a flow chart of illustrating motion (thumb straighten) of a thumb mechanism in accordance with the present invention. Please refer to FIG. 4 and FIG. 1, Step S5: in the case of the thumb mechanism 10 applying onto the user's thumb in a fully bent situation (not shown in the drawings), the thumb motor shaft 111 may change the position of the thumb mechanism 10 by moving backward, and may simultaneously drive the thumb first connecting bar 121 and the thumb drive bar 122 which are connected to the thumb motor shaft 111 respectively to perform the straighten motion. Moreover, during the thumb mechanism 10 is performing the straightened motion; the thumb linear direct drive motor 11 moves upward and downward along with the angle of the extension of the thumb mechanism 10 by utilizing the thumb motor pivot hole 1121 as a fulcrum. Next, Step S6: when the thumb drive bar 122 rotates, the thumb metacarpophalangeal joint mechanism 13 connected to the thumb drive bar 122 may be driven to rotate at the same time, and the thumb motor shaft 111 also rotates with respect to the thumb bottom bar 15 so as to drive the MCP joint of user's thumb to be rotated (make the thumb straightly). Furthermore, the rotation of the thumb first connecting bar 121 may simultaneously drive the thumb second connecting bar 123 that is connected to the thumb first connecting bar 121 to rotate. Next, Step S7: in the case of the rotation of the thumb metacarpophalangeal joint mechanism 13, and the thumb drive bar 122 reaches to a critical situation (for example, user's thumb metacarpophalangeal joints stops rotating) but the thumb motor shaft 111 still moves forward, the rotation of the thumb-finger mechanism 14 is driven and implemented by the rotation of the thumb first connecting bar 121 and the thumb second connecting bar 123. The rotation of the thumb-finger mechanism 14 may simultaneously drive the user's thumb interphalangeal joint to rotate (to result in the thumb straighten). Next, Step S8: the thumb-finger mechanism 14 stops moving when the thumb motor shaft 111 stops moving forward. At this moment, the rotation of the user's interphalangeal joint also stops, and the gesture of user's thumb is changed from the bending state into a straighten state to reach the purpose of straightening the user's thumb. According to those acting steps aforementioned, the straighten motion of the user's thumb driven by the thumb mechanism 10 is performed along with a stable motion of the thumb motor shaft 111. Consequently, the possibly physical damage on the user's thumb made by the actions of those mechanisms aforementioned may be reduced because the straighten of the thumb mechanism 10 is controlled within limited displacements.

FIG. 6 is an exploded drawing of illustrating a finger mechanism in accordance with the present invention, and dash lines in FIG. 6 shows the linking among plural components. As shown in FIG. 6, the finger mechanism 20 includes index finger, middle finger, and ring finger. In addition, the finger mechanism 20 includes a finger linear direct drive motor 21 and a finger connecting bar drive shaft 22. The finger linear direct drive motor 21 includes a finger motor shaft 211 and a finger motor device 212. A finger motor pivot hole 2111 (*i.e.* the motor pivot hole of front on the finger mechanism 20) is deposited at a front end of the finger motor shaft 211, and a finger motor pivot hole 2121 (*i.e.* rear motor pivot hole on the finger mechanism 20) is deposited at a rear end of the finger motor device 212. Next, the finger connecting bar drive shaft 22 includes a finger first drive bar 221 and a finger first connecting bar 222, a finger second connecting bar 223, a finger second drive bar 224, a finger third drive bar 225, and a finger third connecting bar 226. A finger pivot hole 2211 (i.e. the seventh pivot hole on the finger mechanism 20) is positioned at a front end of the finger first drive bar 221, and a finger pivot hole 2212 (i.e. the eighth pivot hole on the finger mechanism 20) for connecting the finger motor pivot hole 2111 is positioned at a rear end of the finger first drive bar 221. Next, the finger first drive bar 221 has an arc design and dimensions of the arc design may be selected for controlling a whole length of the finger mechanism 20, depending on length of user's fingers. A finger pivot hole 2221 (i.e. the first pivot hole on the finger mechanism 20) is positioned at a front end of the finger first connecting bar 222, and a finger pivot hole 2222 (i.e. the second pivot hole on the finger mechanism 20) is positioned near a middle part of the finger first connecting bar 222. Furthermore, the finger pivot hole 2222 is configured to connect the finger motor pivot hole 2111 and the finger pivot hole 2212. A finger pivot hole 2223 (i.e. the third pivot hole on the finger mechanism 20) is positioned at a rear end of the finger first connecting bar 222. A finger pivot hole 2231 (i.e. the fourth pivot hole on the finger mechanism 20) is deposited at a front end of the finger second connecting bar 223, and a finger pivot hole 2232 (i.e. the fifth pivot hole on the finger mechanism 20) is at a rear end of the finger second connecting bar 223 for connecting the finger pivot hole 2221. A finger pivot hole 2241 (i.e. the ninth pivot hole on the finger mechanism 20) is deposited at a front end of the finger second drive bar 224 for connecting the finger pivot hole 2231. A finger pivot hole 2242 (i.e. the tenth pivot hole on the finger mechanism 20) is arranged at a rear end of the finger second drive bar 224. A finger pivot hole 2251 (i.e. the eleventh pivot hole on the finger mechanism 20) is arranged at a front end of the finger third drive bar 225. And a finger pivot hole 2252 for connecting the finger pivot hole 2231 and the finger pivot hole 2241 is deposited at a rear end of the finger third drive bar 225. Furthermore, a finger pivot hole 2261 (i.e. the twenty-first pivot hole on the finger mechanism 20) is deposited at a front end of the finger third connecting bar 226. A finger pivot hole 2262 (i.e. the sixth pivot hole on the finger mechanism 20) is deposited at a rear end of the finger third connecting bar 226 and is configured to connect the finger pivot hole 2252 (i.e. the twelfth pivot hole on the finger mechanism 20), the finger pivot hole 2231, and the finger pivot hole 2241. Preferably, a length of the finger third connecting bar 226 is longer than that of the finger first connecting bar 222 and the finger second connecting bar 223.

Please refer to FIG. 6 continuously; the finger mechanism 20 further includes a finger metacarpophalangeal mechanism 23, a finger proximal phalanx mechanism 24, a finger distal phalanx mechanism 25, and a finger bottom bar 26. The finger metacarpophalangeal mechanism 23 is an inverse U-shaped like structure which provides open space for accommodating the user's fingers (not shown). A finger connecting part 230 is arranged at a front end of the finger metacarpophalangeal mechanism 23 and extends downward a distance. A pair of finger pivot holes 231 (i.e. the thirteenth pivot hole on the finger mechanism 20) is deposited about around a terminal of the finger connecting part 230. A finger pivot hole 232 (i.e. the fourteenth pivot hole on the finger mechanism 20) is deposited near a middle part of the finger metacarpophalangeal mechanism 23 and is configured to connect the finger pivot hole 2242. A finger pivot hole 233 (i.e. the fifteenth pivot hole on the finger mechanism 20) is arranged at a rear end of the finger metacarpophalangeal mechanism 23 and is used to connect the finger pivot hole of 2211. Moreover, the finger proximal phalanx mechanism 24 is also an inverse U-shaped like structure so as to have an open space for accommodating the user's fingers (not shown in the drawing). A finger pivot hole 241 (i.e. the sixteenth pivot hole on the finger mechanism 20) is deposited at a front end of the finger proximal phalanx mechanism 24. A finger pivot hole 243 (i.e. the seventeenth pivot hole on the finger mechanism 20) deposited at a rear end of the finger proximal phalanx mechanism 24 is used to connect the finger pivot hole 231. Furthermore, a finger shaft member 240 is positioned on a top of an inverse U-shaped structure between the front and the rear ends of the finger proximal phalanx mechanism 24 and extends upward to a distance. A finger pivot hole of 242 (i.e. the eighteenth pivot hole on the finger mechanism 20) on one end of the finger shaft member 240 is used to connect a finger pivot hole 2251. Next, the finger distal phalanx mechanism 25 is also an inverse U-shaped like structure so as to have an open space for accommodating the user's fingers (not shown in the drawing). A finger pivot hole 251 (i.e. the nineteenth pivot hole on the finger mechanism 20) is arranged at an upper end of an inverse U-shaped structure and is used to connect the finger pivot hole 2261. A pair of finger pivot holes 252 (i.e. the twentieth pivot hole on the finger mechanism 20) is deposited on a side end of the finger distal phalanx mechanism 25 being close to the side of finger proximal phalanx mechanism 24. The pair of finger pivot holes 252 is used to connect the finger pivot hole 241. A finger bottom bar 26 with a pair of finger through holes 263, 264 is fixed onto the palm base 50 by the locking members 53, 54 (shown as FIG. 1B). A pivot hole 261 (i.e. the front pivot hole on the finger mechanism 20) is arranged at a front end of the finger bottom bar 26, and is used to connect the finger pivot hole 2223. A finger pivot hole 262 (i.e. the rear pivot hole on the finger mechanism 20) deposited at a rear end of the finger bottom bar 26 is used to connect the finger motor pivot hole 2121, so that the finger linear direct drive motor 21 may be mounted onto the finger bottom bar 26.

Next, It is noted that a link point for connecting the finger pivot hole 262 and the finger motor pivot hole 2121 may be a movable fulcrum to movably fix the finger linear direct drive motor 21 within the finger pivot hole of 262. Besides, the finger linear direct drive motor 21 may move forward and backward along with the finger motor shaft 211, and when the finger linear direct drive motor 21 drives the bending or straighten of the finger mechanism 20, the finger linear direct drive motor 21 may move upward and downward along with the angles of bending or straighten of finger mechanism 20. It is obvious that the finger mechanism 20 may be modularized by the connection of the bottom bar of finger 26 and mounted onto the palm base 50 by the locking members 53/54 (shown in FIG. 1B) as well as detached from the palm base 50. Accordingly, the wearable finger rehabilitation apparatus 1 of the present invention may have modular designs for different sizes of the finger mechanism 20 to suit various sizes of the user's thumb for improving the comfort in wearing and rehabilitation effect with the suitable sizes of the rehabilitation apparatus. It is noted that that the connection of the finger through holes 263, 264 and the locking members 53, 54 (shown in FIG. 1B) is implemented by screws. In the case of dimensions of the finger through holes 263, 264 bigger than the ones of the screws (not shown), the volume of finger through holes 263, 264 may be used to adjust the position of the finger mechanisms 20 on the palm base 50 when the locking members 53, 54 are mounted into the finger through holes 263, 264. Thus, radial angles of the finger mechanisms 20 on the palm can be also adjusted according to physiological structure of the user's palm o to make the user wear comfortably.

FIG. 7 is a flow chart illustrating motion (finger bending) of a finger mechanism in accordance with the present invention. Please see FIG. 7 with reference to FIG. 6, Step SS1: in the case of the finger mechanism 20 applying onto the user's finger in a straighten state (not shown in the drawings), the finger motor shaft 211 may change the position of the finger mechanism 20 by moving forward, and simultaneously drive the finger first connecting bar 222 and the finger first drive bar of 221 which are connected to the finger motor shaft 211 to perform the bending motion. Moreover, during the bending motion of the finger mechanism 20, the finger linear direct drive motor 21 moves upward and downward along with the angle of the bending of the finger mechanism 20 by utilizing the finger motor pivot hole 2121 as a fulcrum. Next, Step SS2: when the finger first drive bar 221 rotates, the finger metacarpophalangeal mechanism 23 may be driven to rotate at the same time. When the finger metacarpophalangeal mechanism 23 rotates, user's finger MCP joint can be driven to rotate (to result in the finger bending). Furthermore, the rotation of the finger first connecting bar 222 may simultaneously drive the finger second connecting bar 223 to rotate. Next, Step SS3: when the finger second connecting bar 223 rotates, the finger second drive bar 224, which is connected to the finger second connecting bar 223, can be driven to rotate. Next, Step SS4: the rotations of the finger second connecting bar 223 and the finger second drive bar 224 drive the finger third drive bar 225 to rotate. Next, Step SS5: when the finger third drive bar 225 rotates, it may drive the finger proximal phalanx mechanism 24 to rotate. Moreover, the rotation of the finger proximal phalanx mechanism 24 may drive user's proximal phalange joint to rotate (to result in the finger bending). Next, Step SS6: the rotation of the finger third drive bar 225 further drives the finger third connecting bar 226 to rotate. Next, Step SS7: when the finger third connecting bar 226 rotates, it may drive the finger distal phalanx mechanism 25 to rotate. And when the finger distal phalanx mechanism 25 rotates, it may drive user's distal phalange joint to rotate (to result in the finger bending). Finally, Step SS8: once the finger motor shaft 211 stops moving forward, the rotations of aforementioned components within the finger mechanism 20 can also stop. Consequently, the user's fingers earlier in straighten state are changed to bending state, and the purpose of bending finger of user is achieved, shown in FIG. 8 that is a schematic of illustrating bending of a finger mechanism in accordance with the present invention. With reference of acting steps aforementioned, the bending motion of the user's fingers driven by the finger mechanism 20 is performed along with a stable motion of the finger motor shaft 211. Consequently, possibly physical damage on the user's finger made by the motions of those mechanisms aforementioned may be reduced because the bending of the finger mechanism 20 is controlled within limited displacements.

Next, FIG. 9 is a flow chart of illustrating the motion (finger straighten) of a finger mechanism in accordance with the present invention. Please see FIG. 9 with reference to FIG. 8, Step SS9: in the case of the finger mechanism 20 applying onto the user's finger in the bending state (not shown), the finger motor shaft 211 may change the position of the finger mechanism 20 by backward moving and simultaneously drive the finger first connecting bar 222 and the finger first drive bar 221 which are connected to the finger motor shaft 211 to perform the straighten motion. Moreover, during the straighten motion of the finger mechanism 20, the finger linear direct drive motor 21 moves upward and downward along with the angle of the straighten of the finger mechanism 20 by utilizing the finger motor pivot hole 2121 (as shown in FIG. 6) as a fulcrum. Next, Step SS10: when the finger first drive bar of 221 rotates, the finger metacarpophalangeal mechanism 23 may rotate together at the same time, and to drive the user's MCP joint to rotate (for example, finger straighten). Besides, the rotation of the finger first connecting bar 222 may drive the finger second connecting bar 223 to rotate. Next, Step SS11: when the finger second connecting bar 223 rotates, the finger second drive bar of 224 which is connected to the finger second connecting bar 223 is driven to rotate. Next, Step SS12: the finger second connecting bar 223 and the finger second drive bar 224 can drive the finger third drive bar 225 to rotate. Next, Step SS13: when the finger third drive bar 225 rotates, it can drive the finger proximal phalanx mechanism 24 to rotate, and the rotation of the finger proximal phalanx mechanism 24 can further drive user's proximal phalange joint to rotate (for example, finger straighten). Next, Step SS14: the finger third drive bar 225 further drives the finger third connecting bar 226 to rotate. Next, Step SS15: when the finger third connecting bar 226 rotates, it can drive the finger distal phalanx mechanism 25 to rotate, and the rotation of the finger distal phalanx mechanism 25 can further drive the user's distal phalange joint to rotate (e.g. extension of finger). Next, Step SS16: when the finger motor shaft 211 stops moving forward, the finger distal phalanx mechanism 25 stops rotating, too, as well as the user's distal phalange joint. Consequently, the user's finger in bending state currently is changed into straighten state to achieve purpose of straighten of the user's finger. With reference of acting steps aforementioned, the straighten motion of the user's finger driven by the finger mechanism 20 is performed along with a stable motion of the finger motor shaft 211. Consequently, possibly physical damage on the user's finger made by the motions of those mechanisms aforementioned may be reduced because the extension of the finger mechanism 20 is controlled within limited displacements.

The pinky finger mechanism 30 of the present invention is identical to the finger mechanism 20, so detail constructions, bending or extension process are also referred to FIGS. 6-9, and we will not be repeated therein. However, the position of the pinky finger mechanism 30 equipped onto the palm base 50 is designed in the wearable finger rehabilitation apparatus 1 to meet the finger characteristics of the user, so the position of the pinky finger mechanism 30 will be illustrated in following paragraphs.

FIG. 10 is a schematic of showing a pinky finger mechanism arranged on a palm base in accordance with the present invention. Shown in FIG. 10, the palm base 50 is equipped with the thumb mechanism 10, the three finger mechanisms 20, and the pinky finger mechanism 30. The three finger mechanisms 20 and the pinky finger mechanism 30 on the palm base 50 are in a radial arrangement of small angles but there is a bigger gap between the pinky finger mechanism 30 and the adjacent three finger mechanisms 20. That is, the pinky finger mechanism 30 is positioned at an offset angle α outward with respect to the palm base 50, and the offset angle α is defined by two staggered dash lines 40. The offset angle α, from 5 degrees to 15 degrees generally, may be designed depending on palm shape of user. The offset angle design for the pinky finger mechanism 30 is to increase degrees of freedom of radial arrangement between the four fingers (that is the three finger mechanisms 20 and the pinky finger mechanism 30), which may make user wear comfortably, as well as rehabilitation enhancement with suitable sizes design of thumb mechanism and of finger mechanisms.

Next, FIG. 11 is a schematic of showing an abduction design of the pinky finger mechanism in accordance with the present invention. Shown in FIG. 11, the thumb mechanism 10, the three finger mechanisms 20, and the pinky finger mechanism 30 are arranged on the palm base 50. There is a displacement distance "d" from 1 mm to 10 mm between a motor shaft center line 41a of the linear direct drive motor 31 on the pinky finger mechanism 30 and a center line 41b of the pinky first connecting bar 32 on the pinky finger mechanism 30. It is noted that the pinky first connecting bar 32 is same as the finger first connecting bar 222 (as shown in FIG. 6) on the finger mechanism 20 in a situation aforementioned. The abduction design may further increase the degrees of freedom of the radial arrangement among the four fingers to make user wear comfortably, as well as rehabilitation enhancement.

Next, please refer to FIG. 1A, FIG. 1B, and FIG. 10, the thumb, the three fingers and the pinky finger are equally arranged on the thumb bottom bar 15, the finger bottom bar 26 and the pinky bottom bar 36 to form the modular thumb mechanism 10, the modular three finger mechanisms 20 and the modular pinky finger mechanism 30. Accordingly, the wearable finger rehabilitation apparatus 1 of the present invention may have modular designs for different sizes of the thumb mechanism 10, three finger mechanisms 20, and the pinky finger mechanism 30 to suit various sizes of the user's hand for improving the comfort in wearing and rehabilitation effect with suitable sizes of rehabilitation apparatus.

Moreover, the abduction angle between the modular pinky finger mechanism 30 and the adjacent modular finger mechanism 20 can be adjusted according to the size of the palm of user, which may increase the degrees of freedom of radial arrangement of the four fingers (that is the three finger mechanisms 20 and the pinky finger mechanism 30), makes user wear comfortably, and enhances rehabilitation effect with suitable sizes. Furthermore, the modular thumb mechanism 10 is arranged to connect to the joint connecting part 51 to form a L-shaped like structure that enables the thumb mechanism 10, the three finger mechanisms 20 and the pinky finger mechanism 30 to be fixed at different planes for complying with nature construction/ergonomics of human body. When the thumb mechanism 10, the three finger mechanisms 20 and the pinky finger mechanism 30 are respectively fixed to the L-shaped like structure formed by the palm base 50 and the joint connecting part 51, the thumb mechanism 10 may bend freely at another direction. Besides, the L-shaped like structure formed by the palm base 50 and the joint connecting part 51 not only makes the user's hand easily applied on the wearable finger rehabilitation apparatus 1 but also prevents the thumb mechanism 10 from interfering the finger mechanism 20 and the pinky finger mechanism 30 in bending.

Consequently, the most rehabilitation effects for user can be achieved with the use of the modular wearable finger rehabilitation apparatus 1 of the present invention because of its optimization design, easy wearable, adjustable, comfortable characteristics, and safety with use of linear direct drive motor.

Finally, the thumb linear direct drive motor 11 and the finger linear direct drive motor 21 on the modular wearable finger rehabilitation apparatus 1 may connect to a control device (not shown) with cables, or via wireless network, so that thumb linear direct drive motor 11 and the finger linear direct drive motor 21 on the modular wearable finger rehabilitation apparatus 1 may be controlled by receiving instructions from the control device to execute the rehabilitation of respective finger or whole palm. However, how the wearable finger rehabilitation apparatus 1 to be controlled by receiving instructions from the control device to execute the rehabilitation of respective finger or whole palm is not limited in the present invention.

Those linear direct drive motors in aforementioned or relative embodiments may be equipped with the selective motor shaft of electrical or hydraulic type, or threaded-driving type with threads to implement moving forward and backward along a single axis, which is not limited to a specific type. Moreover, power needed for the linear direct drive motors may be battery, mobile power supply or plugging type, which is not limited to a specific one in the present invention.

While the invention has been described in terms of what is presently considered to be the most practical and preferred embodiments, it is to be understood that the invention does not be limited to the disclosed embodiments. On the contrary, it is intended to cover various modifications and similar arrangements including within the spirit and scope of the appended claims which are to be in accorded with the broadest interpretation so as to encompass all such modifications and similar structures.

What is claimed is:

1. A wearable finger rehabilitation apparatus comprising:
a palm base of a plate structure provided with an end, an other end opposite to the end, and two sides between the end and the other end, and a joint connecting part at one of the sides to form a L-shaped structure by the joint connecting part and the plate structure;
a pinky finger mechanism and three adjacent finger mechanisms are arranged onto the front end of the palm base;
each of the adjacent finger mechanisms comprises a finger linear direct drive motor comprising a finger motor shaft and a finger motor device, wherein the finger motor shaft is arranged in the finger motor device and the finger motor device is arranged onto a finger bottom bar, a front finger motor pivot hole is at a front end of the finger motor shaft, a rear finger motor pivot hole is at a free end of the finger motor device, and a front finger pivot hole and a rear finger pivot hole are at two free ends of the finger bottom bar, and wherein the rear finger motor pivot hole is coupled to the rear finger pivot hole of the free end of the finger bottom bar; and
a thumb mechanism is arranged onto the joint connecting part, the thumb mechanism comprises:
a thumb linear direct drive motor comprising a motor shaft and a motor device, wherein the motor shaft of the thumb linear direct drive motor is arranged in the motor device of the thumb linear direct drive motor, the motor device of the thumb linear direct drive motor is arranged onto a thumb bottom bar, a front thumb motor pivot hole is arranged at a front end of the motor shaft of the thumb linear direct drive motor, a rear thumb motor pivot hole is arranged at a free end of the motor device of the thumb linear direct drive motor, and a front thumb pivot hole and a rear thumb pivot hole are at two free ends of the thumb bottom bar, and wherein the rear thumb motor pivot hole is coupled to the rear thumb pivot hole of the thumb bottom bar;

a thumb first connecting bar provided with a first pivot hole at a front end, a second pivot hole at a middle part, and a third pivot hole at a rear end thereof, wherein the second pivot hole is coupled to the front thumb motor pivot hole, the third pivot hole is coupled to the front thumb pivot hole of the free end of the thumb bottom bar;

a thumb second connecting bar provided with a fourth pivot hole at a front end and a fifth pivot hole at a rear end thereof, wherein the fifth pivot hole is coupled to the first pivot hole;

a thumb drive bar provided with a sixth pivot hole at a front end and a seventh pivot hole at a rear end thereof, wherein the seventh pivot hole is coupled to the second pivot hole;

a thumb metacarpophalangeal joint mechanism provided with an eighth pivot hole at a front end and a ninth pivot hole at another end thereof, wherein the ninth pivot hole is coupled to sixth pivot hole; and a thumb finger mechanism provided with a tenth pivot hole at an upper end thereof and an eleventh pivot hole at an end adjacent to a side on the thumb metacarpophalangeal joint mechanism, wherein the tenth pivot hole is coupled to the fourth pivot hole and the eleventh pivot hole is coupled to the eighth pivot hole;

wherein the finger motor shaft changes a position of the respective adjacent finger mechanism by moving forward and simultaneously bending the respective adjacent finger mechanism, wherein, the finger linear direct drive motor moves upward and downward along with an angle of the bending adjacent finger mechanism by utilizing the rear finger motor pivot hole as a fulcrum;

wherein the pinky finger mechanism is positioned at an offset angle outward with respect to the palm base, the offset angle between the pinky finger mechanism and the adjacent finger mechanism closest to the pinky finger mechanism is from 5 degrees to 15 degrees.

2. The wearable finger rehabilitation apparatus according to claim 1, wherein each of the adjacent finger mechanisms further comprises:

a finger first connecting bar provided with a first finger pivot hole at a front end, a second finger pivot hole at a middle part and a third finger pivot hole at a rear end thereof, wherein the second finger pivot hole is coupled to the front finger motor pivot hole, and the third finger pivot hole is coupled to the front finger pivot hole on the finger bottom bar;

a finger second connecting bar provided with a fourth finger pivot hole at a front end and a fifth finger pivot hole at a rear end thereof, wherein the fifth finger pivot hole is coupled to the first finger pivot hole;

a finger third connecting bar provided with a twenty-first finger pivot hole at a front end and a sixth finger pivot hole at a rear end thereof;

a finger first drive bar provided with a seventh finger pivot hole at a front end and an eighth finger pivot hole at a rear end thereof, wherein the eighth finger pivot hole is coupled to the second finger pivot hole;

a finger second drive bar provided with a ninth finger pivot hole at a front end and a tenth finger pivot hole at a rear end thereof;

a finger third drive bar provided with an eleventh finger pivot hole at a front end and a twelfth finger pivot hole at a rear end thereof, wherein the twelfth finger pivot hole is coupled to the fourth finger pivot hole, the ninth finger pivot hole and the sixth finger pivot hole;

a finger metacarpophalangeal mechanism provided with a connection portion extending downward at a front end thereof, a thirteenth finger pivot hole at an end of the connection portion of the first metacarpophalangeal, a fourteenth finger pivot hole at a middle part thereof, and a fifteenth finger pivot hole at another end thereof, wherein the fourteenth finger pivot hole is coupled to the tenth finger pivot hole, and the fifteenth finger pivot hole is coupled to the seventh finger pivot hole;

a finger proximal phalanx mechanism provided with a sixteenth finger pivot hole at a front end and a seventeenth finger pivot hole at another end thereof, a connection portion of the finger proximal phalanx mechanism extending upward and arranged between the two ends of the finger proximal phalanx mechanism, and an eighteenth finger pivot hole at an end of the connection portion of the finger proximal phalanx mechanism, wherein the seventeenth finger pivot hole is coupled to the thirteenth finger pivot hole, and the eighteenth finger pivot hole is coupled to the eleventh finger pivot hole; and a finger distal phalanx mechanism provided with a nineteenth finger pivot hole at an upper end thereof, and a twentieth finger pivot hole is arranged at an end adjacent to a side on a distal finger interphalangeal joint mechanism, wherein the nineteenth finger pivot hole is coupled to the twenty-first finger pivot hole, and the twentieth finger pivot hole is coupled to the sixteenth finger pivot hole.

3. The wearable finger rehabilitation apparatus according to claim 2, wherein the finger motor shaft of the finger mechanism has a first center line and the finger first connecting bar has a second center line, and there is a displacement distance between the first center line and the second center line.

* * * * *